Nov. 3, 1953  H. S. PIKE  2,657,879
CABLE GUIDING APPARATUS
Filed Jan. 12, 1952  2 Sheets-Sheet 2

INVENTOR
H. S. PIKE
BY
W. C. Parnell
ATTORNEY

Patented Nov. 3, 1953

2,657,879

UNITED STATES PATENT OFFICE 2,657,879

CABLE GUIDING APPARATUS

Harold S. Pike, Fanwood, N. J., assignor to Western Electric Company, Incorporated, New York, N. Y., a corporation of New York Application January 12, 1952, Serial No. 266,212

10 Claims. (Cl. 242—157)

This invention relates to apparatus for guiding cables and more particularly to cable guiding apparatus for distributing cable on takeup reels.

In certain reeling mechanism when measured lengths of cable are to be withdrawn from a supply reel and wound on a takeup reel, counter units travel with the distributing mechanism which reciprocates between predetermined limits depending upon the width of each takeup reel. In such instances, it is important to cause not only uniform distribution of the cable on the takeup reel but to guide the cable in a given path relative to the counter unit to establish accurate measurement of the cable. Furthermore, the cables which are measured and distributed upon takeup reels vary in size presenting the added problem of accurately guiding all cables in a given path relative to the counter unit regardless of the cross-sectional dimensions of the cables.

An object of the present invention is an apparatus which is simple in structure, readily actuable and highly efficient in guiding cables of various sizes in a given path.

With this and other objects in view, the invention comprises an apparatus for guiding cables of various sizes singly in a given path by positioning rollers on arms at angles with respect to each other and providing means to actuate the arms whereby the rollers will be moved simultaneously like distances to engage and guide the cables singly along the given path. More specifically, the apparatus in the present embodiment of the invention is a part of a distributing mechanism employed in combination with a counter unit and including sets of rollers disposed upon each side of the counter unit and supported by pivotally connected arms under the control of an operating mechanism whereby the arms may be actuated to simultaneously move the rollers in each set like distances relative to the path of the cable and cause them to lie tangentially of the cables of various sizes.

Other objects and advantages will be apparent from the following detailed description when considered in conjunction with the accompanying drawings wherein Fig. 1 is a front elevational view of the apparatus shown in conjunction with a counter unit of a distributor mechanism.

Figure 1:
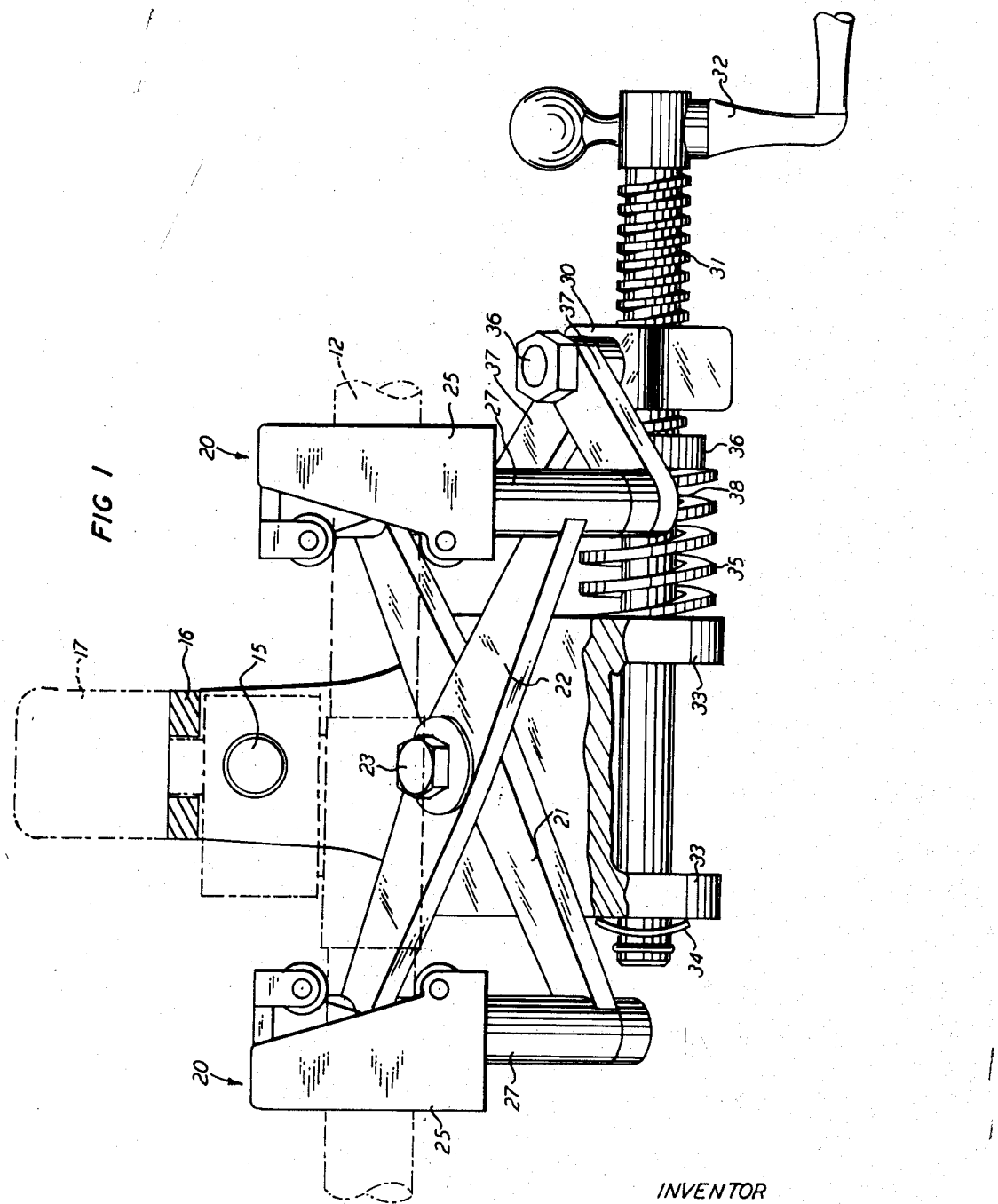

Referring now to the drawings, the apparatus in the present embodiment of the invention includes a reciprocably movable member 10 which is substantially U shaped in general contour having its central portion mounted on a vertical pivot 11 of a distributor. The member 10 of the distributor is movable between predetermined limits to distribute cables 12 of various sizes on a takeup reel not shown. The purpose of the pivot 11 for the member 10 is to allow the member to rock thereon during distribution of the cable on the takeup reel.

A cradle 14 is pivotally supported at 15 between the upper ends of the member 10 and has a horizontal member 16 mounted on the upper ends thereof to support a counter unit 17. The counter unit which is shown in combination with the apparatus for guiding cables is the subject matter of my co-pending application, Serial Number 266,213, filed January 12, 1952, and the entire mechanism shown in the drawings is a part of the reeling apparatus shown in my co-pending application, Serial Number 266,215, filed January 12, 1952. The counter unit 17 includes rollers 18 adjustably positioned to engage opposing surfaces of the cable 12. The cable 12 may be of various sizes and it is important that regardless of the size of the cable, it will be guided in a given path relative to the rollers 18 of the counter unit. This is accomplished by the roller units 20 supported by the ends of arms 21 and 22 mounted at their centers on a pivot 23.

Figure 2:
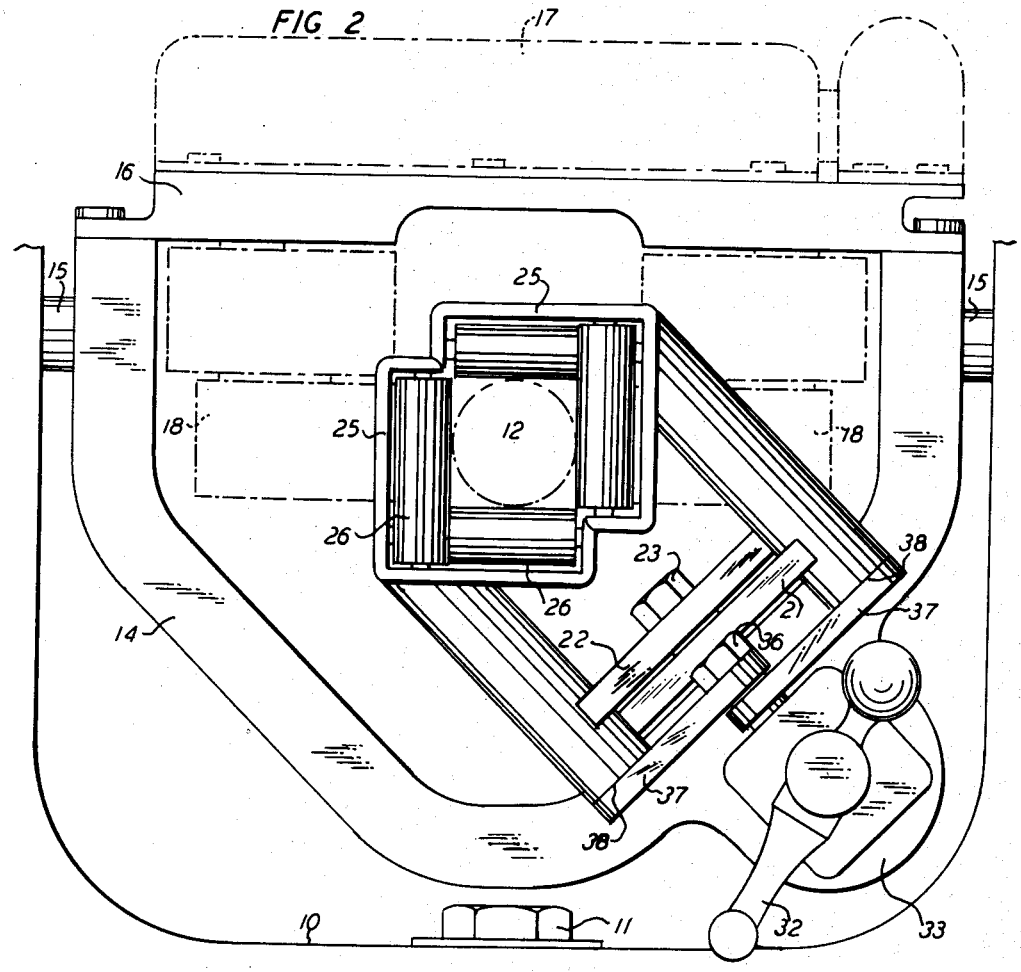
Fig. 2 is an end elevational view of the apparatus.
Figure 3:
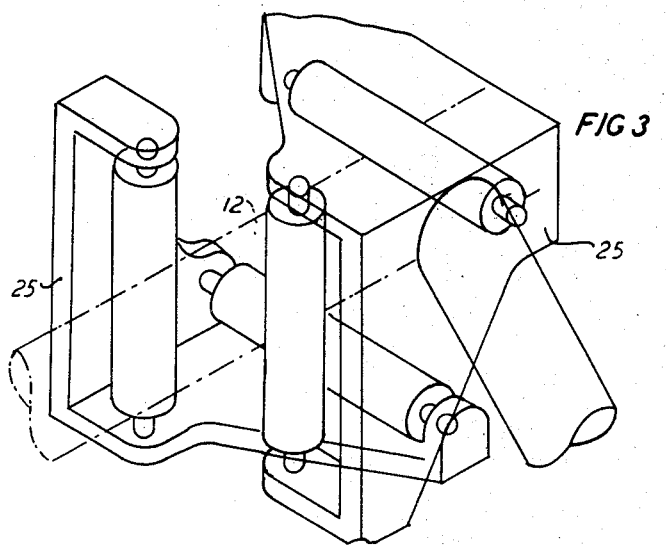
Fig. 3 is an isometric view of one set of guiding rollers.

By viewing Figs. 2 and 3, it will be noted that the roller units 20 are identical in structure with the possible exception of the fact that one might be called a left hand unit and the other a right hand unit. Each unit includes like holders 25 formed as illustrated in Fig. 3 to receive their respective pairs of rollers 26 and support them for rotation at angles with respect to each other to provide four rollers in each set surrounding the path of the cable. The two rollers 26 carried by each supporting element 25 extend at substantially right angles with respect to each other and the pairs of rollers are diametrically opposed whereby they may move relative to each other so that their inner surfaces will lie in planes forming a square, about the centerline of the path through which the cable may travel, variable in size with variations in the size of the cable so that each roller will engage the cable.

The arms 21 and 22 are of equal lengths and, as the portions thereof which extend outwardly from the pivot to the parts 27 which support the elements 25 are equal, movement of the arms 21 and 22 like distances relative to each other and the counter unit will vary the positions of the rollers to vary the size of the path through which the cable may travel and maintain the center lines of all cables constant regardless of their variations in size. The means for accomplishing this result includes an internally threaded element 30 mounted on a threaded shaft 31 which is rotatable through the aid of a crank 32 and supported in apertured portions 33 of the cradle 14. A collar 34 limits axial movement of the shaft 31 to the right. A spring 35 disposed concentric with the shaft between a collar 36, fixed to the shaft, and the adjacent portion 33 urges the shaft to the right. The internally threaded element 30 is pivotally connected at 36 to like ends of links 37 which have their other ends connected at 38 to the arms 21 and 22.

Considering now the operation of the apparatus, it will be apparent that the roller units 20 in the present adjusted positions will accurately guide the cable 12 in a given path relative to the counter unit 17. Furthermore, the apparatus in the present embodiment of the invention is a part of a distributing mechanism wherein the roller units are constantly reciprocated between given limits with the counter unit to distribute the cable uniformly on a takeup reel. The roller units not only provide the guiding means for the distributor mechanism during the continuously varying path of the cable but maintains the cable in a given path between the rollers of the counter unit.

If the apparatus is to guide a cable of a size different from that shown in the drawings, the operator may actuate the crank 32 to rotate the threaded shaft 31 in one direction or the other depending upon whether the cable to be measured is larger or smaller than the cable 12. Rotation of the threaded shaft 31 will impart movement to the element 30 to move the links 37 and simultaneously move the arms 21 and 22 like distances so that the pairs of rollers in each unit will move like distances relative to the center line of the path through which all of the cables are to travel regardless of their size. The adjustment of the roller units may be such that all of the rollers will tangentially engage their respective portions of the cable to maintain accurate guiding of the cable. Through the existence of the spring 35, the rollers may be forced under variable tensions against the cable. Another function of the spring is to permit relative movement of the pairs of rollers in each unit should there appear in the cable a portion which is larger than the other portions thereof.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for guiding cables of various sizes singly in a given path comprising rollers disposed at angles with respect to each other about the path, arms supporting the rollers in their respective positions, and means operatively connecting the arms actuable to move the arms whereby the rollers will be moved simultaneously like distances to engage and guide cables of various sizes singly along the given path.

2. An apparatus for guiding cables of various sizes singly in a given path comprising spaced sets of rollers, the rollers in each set being disposed at angles with respect to each other about the path, arms supporting the rollers in their respective positions, and means operatively connecting the arms actuable to move the arms whereby the rollers will be moved simultaneously like distances to engage and guide cables of various sizes singly along the given path.

3. An apparatus for guiding cables of various sizes singly in a given path comprising rollers disposed at angles with respect to each other about the path, arms supporting the rollers in their respective positions, means operatively connecting the arms actuable to move the arms whereby the rollers will be moved simultaneously like distances to engage and guide cables of various sizes singly along the given path and means to apply like forces to all the rollers to urge them toward the cable.

4. An apparatus for guiding cables of various sizes singly in a given path comprising pairs of substantially right-angularly positioned diametrically opposed rollers, holders for the pairs of rollers in their respective positions about the path, arms supporting the holders, and means to move the arms simultaneously whereby the rollers will engage singly cables of various sizes tangentially at substantially equally spaced positions to guide the cables in the said path.

5. An apparatus for guiding cables of various sizes singly in a given path comprising holding elements disposed on opposite sides of the path, pairs of substantially right-angularly positioned rollers rotatably mounted in their respective positions in their elements, whereby each roller of one pair will be disposed parallel with and diametrically opposed a roller of the other pair, and means to move the elements simultaneously to position them to guide cables of various sizes.

6. An apparatus for guiding cables of various sizes singly in a given path comprising holding elements disposed on opposite sides of the path, pairs of substantially right-angularly positioned rollers rotatably mounted in their respective positions in their elements, whereby each roller of one pair will be disposed parallel with and diametrically opposed a roller of the other pair, and arms to support the elements mounted for movement whereby the rollers may be moved like distances relative to the path and maintained for engagement at substantially equally spaced positions about the cables singly.

7. An apparatus for guiding cables of various sizes singly in a given path comprising holding elements disposed on opposite sides of the path, pairs of substantially right-angularly positioned rollers rotatably mounted in their respective positions in their elements, whereby each roller of one pair will be disposed parallel with and diametrically opposed a roller of the other pair, and arms to support the elements mounted for movement whereby the rollers may be moved like distances relative to the path and maintained for engagement at substantially equally spaced positions about the cables singly and means actuable to move the arms simultaneously.

8. An apparatus for guiding cables of various sizes singly in a given path through a pre-determined area comprising holding elements disposed in diametrically opposed pairs adjacent the ends of the area, companion pairs of substantially right-angularly positioned rollers rotatably mounted in their respective positions in their elements, whereby each roller of each pair will be disposed parallel with and diametrically opposed a roller of its companion pair, and means to move the elements simultaneously to position them to guide cables of various sizes.

9. An apparatus for guiding cables of various sizes singly in a given path through a pre-determined area comprising holding elements disposed in diametrically opposed pairs adjacent the ends of the area, companion pairs of substantially right-angularly positioned rollers rotatably mounted in their respective positions in their elements, whereby each roller of each pair will be disposed parallel with and diametrically opposed a roller of its companion pair, and arms to support the elements mounted for movement whereby the rollers may be moved like distances relative to the path and maintained for engagement at substantially equally spaced positions about the cables singly.

10. An apparatus for guiding cables of various sizes singly in a given path through a pre-determined area comprising holding elements disposed in diametrically opposed pairs adjacent the ends of the area, companion pairs of substantially right-angularly positioned rollers rotatably mounted in their respective positions in their elements, whereby each roller of each pair will be disposed parallel with and diametrically opposed a roller of its companion pair, and arms to support the elements mounted for movement whereby the rollers may be moved like distances relative to the path and maintained for engagement at substantially equally spaced positions about the cables singly, and means actuable to move the arms simultaneously.

HAROLD S. PIKE.

References Cited in the file of this patent

UNITED STATES PATENTS

| Number | Name | Date |
|---|---|---|
| 1,849,924 | Hall et al. | Mar. 15, 1932 |
| 1,941,250 | Dale | Dec. 26, 1933 |
| 2,255,314 | Graham | Sept. 9, 1941 |